Sept. 17, 1963  A. J. BERNA  3,103,799
ANGULAR ROTARY DRIVE
Filed April 10, 1961
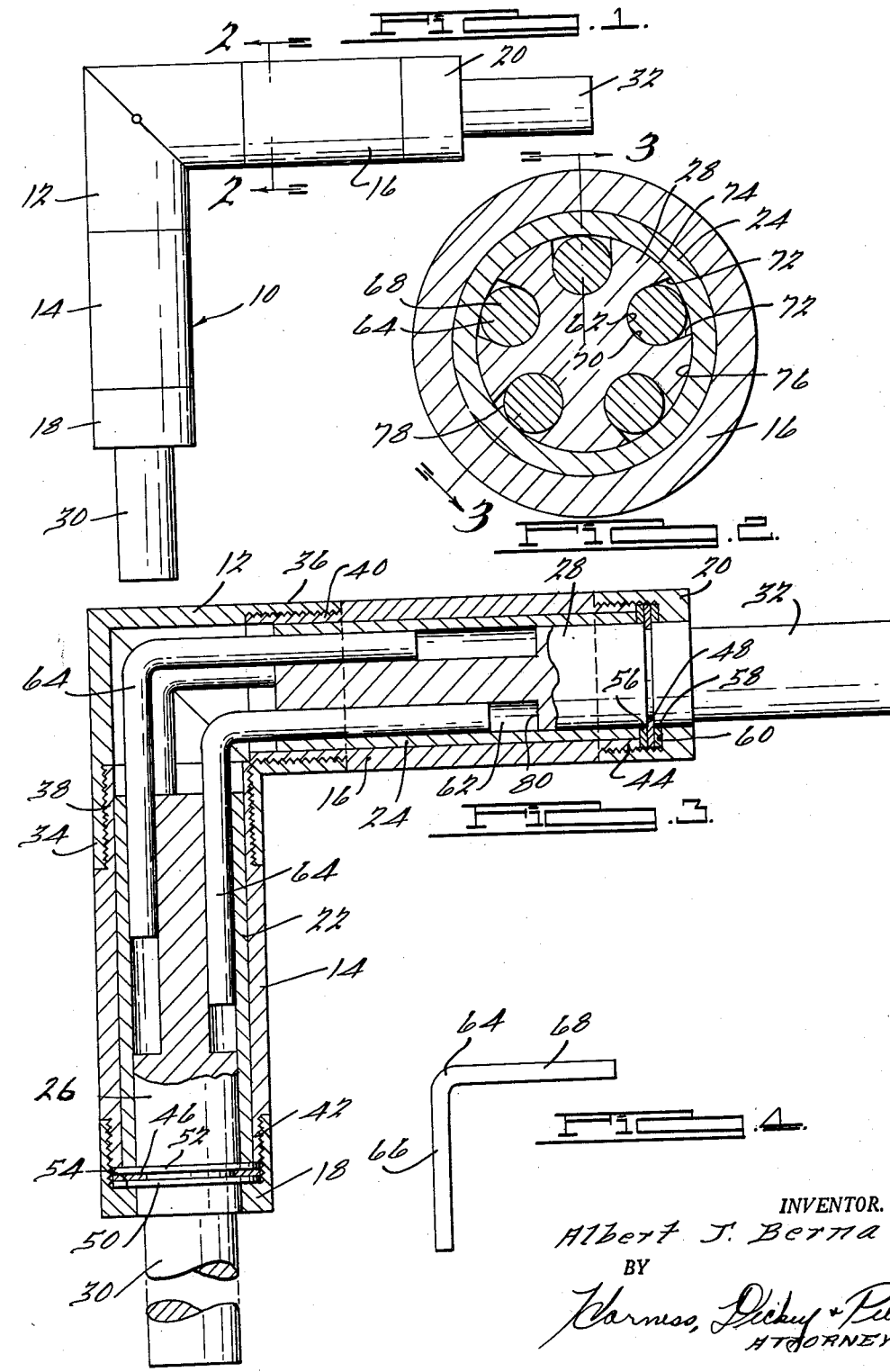
INVENTOR.
Albert J. Berna
BY
Harness, Dickey & Pierce
ATTORNEYS United States Patent Office 3,103,799
Patented Sept. 17, 1963

3,103,799
ANGULAR ROTARY DRIVE
Albert J. Berna, 18690 Lauder, Detroit, Mich.
Filed Apr. 10, 1961, Ser. No. 101,868
10 Claims. (Cl. 64—20)

This invention relates to a coupling or joint for transmitting rotary power and particularly to a device for transmitting power between a driving member and a driven member having angularly disposed axes of rotation.

It is an object of the present invention to provide a device of the above character which may be inexpensively manufactured, which is compact in size, rugged in construction, easily assembled and disassembled and possesses a long, useful life.

It is still another object of the present invention to provide a device of the above character having a plurality of reciprocating connecting rods connecting a pair of rotors in which the rotors are provided with means adapted to vent air to and from the portions of the rotors in which the rods reciprocate thereby eliminating air pressure resistance to the free rotation of the rotors.

It is still another object of the present invention to provide a device of the above character in which lubricant may be entirely sealed within a protective housing and in which an adequate supply of lubricant is fully distributed to all moving and wear-receiving parts.

These and other objects of the present invention will become apparent from the following detailed description taken in conjunction with the accompanying drawings wherein:

FIGURE 1 is an elevational view of a device embodying the principles of the present invention;

FIG. 2 is an enlarged sectional view of the structure shown in FIGURE 1, taken along the line 2—2 thereof;

FIG. 3 is a sectional view of the structure shown in FIGURE 1, taken along the line 3—3 thereof; and FIG. 4 is a reduced scale view of one of the connecting rods shown in FIG. 3.

Referring now to the drawings, FIGURE 1 illustrates a housing 10 of right-angle tubular form. The housing includes a central elbow portion 12, sleeve portions 14 and 16 and end cover elements 18 and 20. The tubular portion 14 is fitted with a plain sleeve bearing 22, while the tubular portion 16 is fitted with a plain sleeve bearing 24. Two identical rotors 26 and 28 are snugly but rotatably supported within the bearings 22 and 24, respectively. While the angle at which the axes of rotation of the rotors 26 and 28 are disposed to one another may vary anywhere between 90° and 180°, the particular device illustrated herein is designed to connect rotating elements having their axes disposed at right-angle relation and, accordingly, the axes of rotation of the rotors are similarly arranged. The rotors 26 and 28 have integral shaft portions 30 and 32, respectively, and rotary power is intended to be supplied to one of the shafts 30 or 32 for delivery to the other of said shafts.

As may be seen in FIG. 3, the central elbow portion 12 is internally threaded at its opposite ends 34 and 36, which ends are of enlarged internal diameter. The housing portion 14 has a reduced outside diameter end 38 which is threaded into the elbow end portion 34 to join the housing portion 14 securely to the elbow 12. The housing portion 16 is provided with a reduced outside diameter end portion 40 threaded into the elbow end portion 36 to join the housing portion 16 securely to the elbow 12. The housing portions 14 and 16 are additionally provided with threaded reduced outside diameter end portions 42 and 44, respectively, onto which the end cover elements 18 and 20, respectively, are threaded.

Axial or linear movement of the rotors 26 and 28 within the housing sections is prevented by means including snap rings 46 and 48 fitted within peripheral grooves formed in the rotors 26 and 28, respectively. The snap ring 46 is confined between thrust washers 50 and 52 which are held in place between a shoulder 54 on the end cover member 18 and the end of the housing section 14. The snap ring 48 is held in place between thrust washers 56 and 58 which surround the rotor 28 and are confined between a shoulder 60 on the end cover 20 and the adjacent end of the housing section 16.

As may be seen in FIG. 2, each of the rotors 26 and 28 is provided with a plurality of circumferentially spaced peripheral grooves 62 which extend axially along the rotor; that is, in the direction of the axis of rotation of the rotor in which they are formed. A plurality of connecting rods or torque transmitting elements 64 interconnect the rotors 26 and 28 and are each provided with two straight cylindrical portions disposed in the same angular relationship as the rotors 26 and 28 which, in this case, is 90°. One portion 66 of each rod is disposed within one of the grooves 62 of the rotor 26 and another portion 68 of the rods is disposed within one of the grooves 62 of the rotor 28. The rods 64 are formed from a single straight length of bar stock, which is centrally bent to the desired angle. As may be seen in FIG. 2, the depth of the grooves 62 corresponds to the diameter of the rods 64. Each groove 62 is provided with a semi-cylindrical radially inner portion 70 and opposite straight side walls 72 extending from the semi-cylindrical portion 70 to the periphery 74 of the rotor. Thus, the rod will engage the inside diameter 76 of the adjacent bearing during rotation. It will be seen that the straight side walls 72 provide cavities or openings 78 between the rods 64 and the bearing surface 76 on opposite sides of the lines on which the rods engage the surface 76. The cavities 78 serve both as repositories for lubricant and, also, as air venting passages to permit the movement of air to and from the varying volume space between the ends of the rotors and the adjacent end walls of the grooves 62.

As illustrated by reference to the rotor 28 in FIG. 3, it will be seen that the grooves 62 terminate in end walls 80. Upon each full revolution of the rotors, each connecting rod will both move in a direction in which its opposite ends will approach the adjacent end walls 80 of the grooves 62 in which it is located and also in a direction in which its ends move away from the end walls 80. In so doing, each section of the rod both attempts to compress the air within the groove 62 between its free end and the adjacent end wall 80 and then tries to evacuate the end of the groove. The openings 78 provide passages for the movement of air to and from the hollow interior of the elbow portion 12, thus eliminating an air pressure resistance to the free movement of the rotors. It will be noted that the present construction eliminates the necessity of the grooves 62 being left open at their outer ends. Thus, the unit is very compact and the unit may be constructed to enclose the rods 64 and a lubricant within the housing.

Inasmuch as the rotor grooves 62 are open to the bearing surfaces 76, the lubricant which is carried within the grooves 62 is free to lubricate the bearing surfaces 76. Furthermore, lubricant within the elbow portion 12 will contact the rods 64 and be carried into the rotor grooves, thereby assuring a full distribution of lubricant to the moving parts of the device. While varying lubricants may be utilized in the device, it is believed that a grease fortified with molybdenum disulfide will render particularly effective performance and will impart a long-lasting, low coefficient of friction surface to the parts with which it comes in contact.

The sleeve bearings 22 and 24 illustrated herein may be made from bronze, sintered metal or other suitable material. It is to be noted, however, that separate bearing members may not be necessary, depending upon the type of service desired. It is possible to utilize the inside diameter surface of the housing portions 14 and 16 as the bearing surface supporting the rotors 26 and 28 and to dispense with separate bearing members.

It will be noted that the rotors 26 and 28 are of a relatively simple form which may be readily machined from bar stock. While the rotors are shown as having a substantial length of material between the groove end walls 80 and the adjacent snap ring 46 or 48, the rotors may be considerably shortened in this location when greater compactness of length is desired. In such a case, the housing sections 14 and 16 would be similarly shortened, resulting in an overall smaller unit.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A device for the transmission of rotary power including a housing having a pair of angularly disposed cylindrical bearing surfaces defining rotor chambers, a pair of rotors supported one in each of said chambers, each of said rotors having a plurality of circumferentially spaced axially extending peripheral grooves, a plurality of connecting rods each having a pair of angularly disposed cylindrical portions, one cylindrical portion of each of said connecting rods being carried in a groove of one of said rotors and the other cylindrical portion of each of said connecting rods being carried in a groove of the other of said rotors, said cylindrical portions being engageable with the adjacent of said bearing surfaces, and said grooves being shaped to provide openings extending along said cylindrical portions for the length of said grooves.

2. A device for the transmission of rotary power including a housing having a central hollow interior and a pair of angularly disposed cylindrical bearing surfaces defining rotor chambers on opposite sides of said central hollow interior, a pair of rotors supported one in each of said chambers, each of said rotors having a plurality of circumferentially spaced axially extending peripheral grooves, a plurality of connecting rods extending through said central hollow interior and each having a pair of angularly disposed cylindrical portions, one cylindrical portion of each connecting rod being carried in a groove of one of said rotors and the other cylindrical portion of each connecting rod being carried in a groove of the other of said rotors, said cylindrical portions being engageable with the adjacent of said bearing surfaces, and said grooves having an opening extending along said connecting rods communicating with said central hollow interior.

3. A device for the transmission of rotary power including a housing having a central hollow elbow portion and sleeve portions on opposite sides of said elbow portion, a pair of rotors supported one in each of said sleeve portions, each of said rotors having a plurality of circumferentially spaced axially extending peripheral grooves, a plurality of connecting rods extending through said elbow portion and each having a pair of angularly disposed cylindrical portions, one cylindrical portion of each connecting rod being carried in a groove of one of said rotors and the other cylindrical portion of each of said connecting rods being carried in a groove of the other of said rotors, said grooves being open to said elbow portion at one end thereof and terminating in end walls at the opposite ends thereof and said grooves being shaped to provide an opening along said cylindrical portions for the escape of air from the end of said grooves adjacent said end walls to the interior of said elbow portion.

4. A device for the transmission of rotary power including housing means provided with a pair of angularly disposed cylindrical bearing surfaces defining rotor chambers, a pair of rotors supported one in each of said chambers, each of said rotors having a plurality of circumferentially spaced axially extending peripheral grooves, each of said grooves having a semi-cylindrical surface at the radially inner side thereof and opposite straight side walls adjacent the periphery of the rotor, a plurality of connecting rods each having a pair of angularly disposed cylindrical portions, one cylindrical portion of each connecting rod being carried in a groove of one of said rotors and the other cylindrical portion of each of said connecting rods being carried in a groove of the other of said rotors, said cylindrical portions being engageable with the adjacent of said bearing surfaces and being spaced from said opposite straight side walls to provide openings extending the length of said grooves.

5. A device for the transmission of rotary power including a housing having a central elbow portion and sleeve portions on opposite sides thereof provided with angularly disposed cylindrical bearing surfaces defining rotor means, a pair of rotors supported one in each of said chambers, each of said rotors having a plurality of circumferentially spaced axially extending peripheral grooves, a plurality of connecting rods extending through said elbow portion and each having a pair of angularly disposed cylindrical portions, one cylindrical portion of each connecting rod being carried in a groove of one of said rotors and the other cylindrical portion of each of said connecting rods being carried in the other of said rotors, said grooves having openings extending along said cylindrical portion adjacent said bearing surfaces, shaft means extending from said rotors at the ends thereof opposite from said elbow portion, snap rings carried on the periphery of said rotors at the ends thereof opposite from said elbow portion, and end cover members closing said sleeve portions at the ends thereof opposite from said elbow portion and operable to confine said snap rings adjacent the ends of said sleeve portions to prevent axial movement of said rotors.

6. A device for the transmission of rotary power including housing means provided with a pair of angularly disposed cylindrical bearing surfaces defining rotor chambers, a pair of rotors supported one in each of said chambers, each of said rotors having a plurality of circumferentially spaced axially extending peripheral grooves, said grooves having semi-cylindrical bottom walls at the radially inner side thereof and opposite parallel side walls extending from said bottom walls to the periphery of the rotor and a plurality of connecting rods each having a pair of cylindrical portions of circular cross section disposed in fixed angular relation corresponding to the angular relation of said bearing surfaces, one cylindrical portion of each connecting rod being carried in a groove of one of said rotors and the other cylindrical portion of each connecting rod being carried in a groove of the other of said rotors, said cylindrical portions conformingly engaging the semi-cylindrical walls of the grooves in which they are disposed, said cylindrical portions being engageable with the adjacent of said bearing surfaces and cooperating with said bearing surfaces and said side walls to define openings extending longitudinally of said grooves.

7. The structure set forth in claim 6 in which said housing means is provided with an enclosed elbow portion disposed between said rotor chambers and in which said grooves are open to said elbow portion at one end thereof and terminate in end walls at the opposite end thereof.

8. The structure set forth in claim 6 in which the radial distance between said semi-cylindrical groove walls and the adjacent of said bearing surfaces is substantially equal to the diameter of said cylindrical connecting rod portions received therein.

9. A device for the transmission of rotory power including a housing having a pair of angularly disposed rotor chambers, a pair of rotors supported one in each of said chambers, a pair of sleeves, each of said sleeves surrounding one of said rotors, each of said rotors having a plurality of circumferentially spaced axially extending peripheral grooves open to the adjacent of said sleeves, and a plurality of connecting rods each having a pair of angularly disposed cylindrical portions, one cylindrical portion of each of said connecting rods being carried in a groove of one of said rotors and the other cylindrical portion of each of said connecting rods being carried in a groove of the other of said rotors, said cylindrical portions being engageable with the adjacent of said sleeves, and said grooves being shaped to provide openings extending along said cylindrical portions for the length of said grooves.

10. A device for the transmission of rotary power including a housing having a pair of angularly disposed rotor chambers, a pair of rotors supported one in each of said chambers, a pair of sleeves, each of said sleeves surrounding one of said rotors, each of said rotors having a plurality of circumferentially spaced axially extending peripheral grooves, said grooves having semi-cylindrical bottom walls at the radially inner side thereof, and opposite parallel side walls extending from said bottom walls to the periphery of the rotor and a plurality of connecting rods each having a pair of cylindrical portions of circular cross-section disposed in fixed angular relation corresponding to the angular relation of said bearing surfaces, one cylindrical portion of each connecting rod being carried in a groove of one of said rotors and the other cylindrical portion of each connecting rod being carried in a groove of the other of said rotors, said cylindrical portions being conformingly engageable with the semi-cylindrical walls of the grooves in which they are disposed, said cylindrical portions being engageable with the adjacent of said sleeves and cooperating with said sleeves and said side walls to define openings extending longitudinally of said grooves.

References Cited in the file of this patent

UNITED STATES PATENTS

| | | |
|---|---|---|
| 1,119,514 | Jonsson | Dec. 1, 1914 |
| 1,166,401 | Faltin | Dec. 28, 1915 |
| 2,022,909 | Glen | Dec. 3, 1935 |
| 2,218,303 | Smith | Oct. 15, 1940 |
| 2,485,893 | Kost | Oct. 25, 1949 |
| 2,703,737 | Turner | Mar. 8, 1955 |
| 2,984,528 | Shaffer | May 16, 1961 |

FOREIGN PATENTS

| | | |
|---|---|---|
| 102,090 | Switzerland | Dec. 1, 1923 |
| 359,754 | Italy | June 4, 1938 |
| 377,639 | Italy | Dec. 27, 1939 |